W. CUSHING.
FEED MECHANISM FOR TUBE CUTTERS.
APPLICATION FILED OCT. 12, 1908.
935,467.
Patented Sept. 28, 1909.
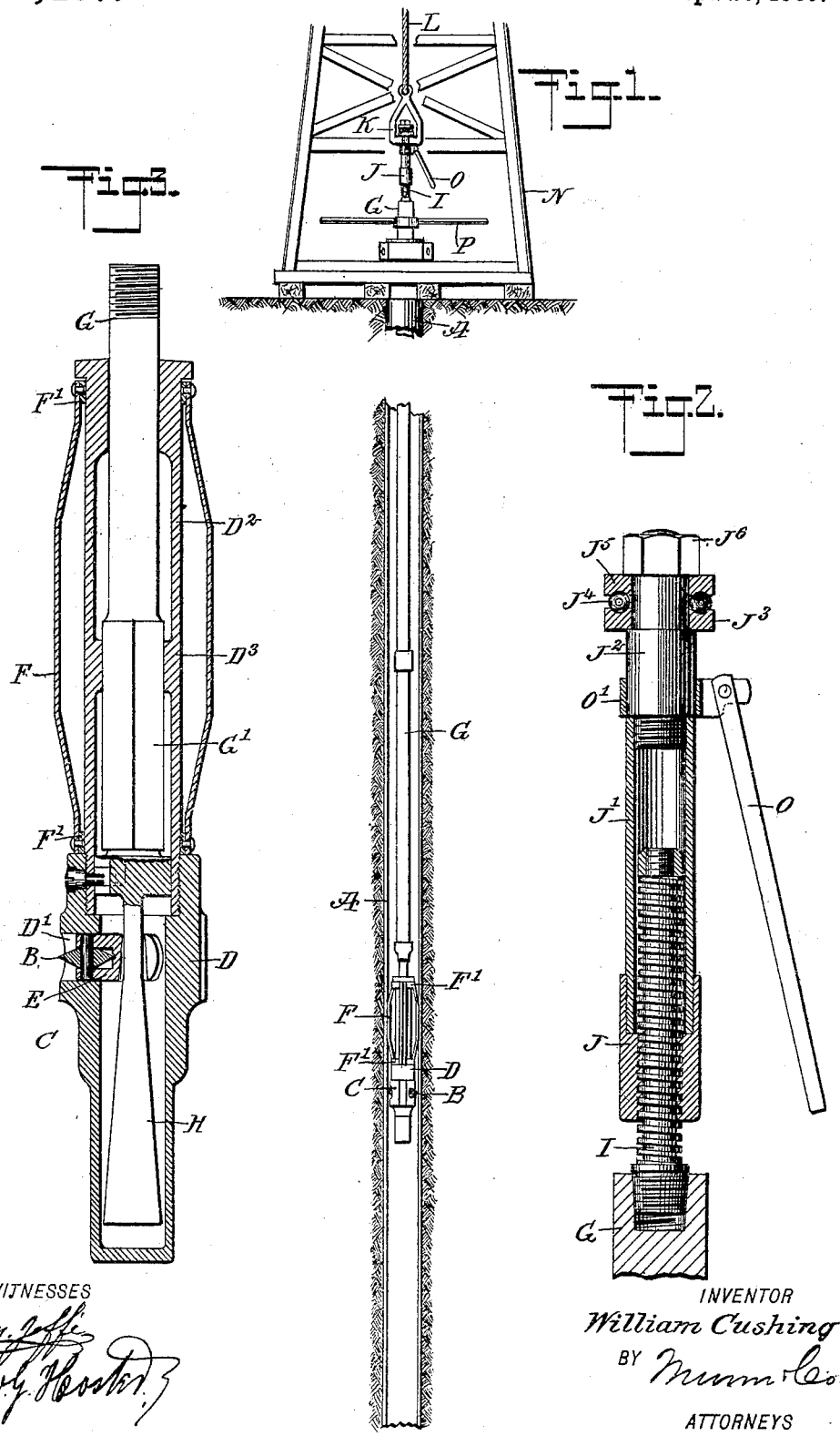
INVENTOR
William Cushing

UNITED STATES PATENT OFFICE.

WILLIAM CUSHING, OF CLAYSVILLE, PENNSYLVANIA.

FEED MECHANISM FOR TUBE-CUTTERS.

935,467.  Specification of Letters Patent. Patented Sept. 28, 1909.

Application filed October 12, 1908. Serial No. 457,271.

*To all whom it may concern:*

Be it known that I, WILLIAM CUSHING, a citizen of the United States, and a resident of Claysville, in the county of Washington and State of Pennsylvania, have invented a new and Improved Feed Mechanism for Tube-Cutters, of which the following is a full, clear, and exact description.

The invention relates to revoluble cutters used for cutting the casings of oil or other wells at various depths, preparatory to withdrawing the cut-off casing section from the well.

The object of the invention is to provide a new and improved feed mechanism for feeding a mandrel used for forcing the cutting wheels of the revoluble cutter outward in a gradual but positive manner, to insure the proper cutting of the cutting wheels without danger of injury to the same.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied, the casing to be cut being shown in section; Fig. 2 is an enlarged sectional side elevation of the improvement; and Fig. 3 is an enlarged sectional side elevation of the revoluble cutter used for cutting the casing.

The casing A of the well is adapted to be cut at any desired depth by the cutter wheels B of a cutter head C, adapted to be passed into the casing A, to bring the cutter wheels B to the desired place of cutting. The cutter C has its body D provided with openings D', in each of which is mounted to slide a bearing E in which a corresponding cutter wheel B is journaled, as indicated in Fig. 3. The body D is provided on top with a tubular extension $D^2$ mounted to turn in rings F' connected with each other by springs F bearing against the inner face of the casing A, so as to hold the rings F' stationary for the extension $D^2$ to turn in, as hereinafter more fully explained. In the extension $D^2$ of the body D is formed a polygonal bearing $D^3$ for the correspondingly shaped lower end G' of the tubing G extending up through the casing A to the ground, as indicated in Fig. 1. From the lower end of the tubing G depends the conical mandrel H engaging the bearings E, so as to force the same outward when the mandrel H is lifted, with a view to feed the cutter wheels B into the wall of the casing A for cutting the same.

The cutter so far described forms no part of my invention, which consists in lifting the tubing G gradually, with a view to raise the mandrel H and thus force the bearings E outward, to cause the cutters B to cut into the wall of the tubing A. For the purpose mentioned, the upper end of the tubing G is provided with a screw rod I screwed or otherwise secured to the tubing G, and on the said screw rod I screws a nut J having a tubular extension J', in which is fastened a spindle $J^2$ mounted to turn loosely in a support K held on a hoisting rope L mounted on the well derrick N, as indicated in Fig. 1. The support K abuts against the under side of a ball bearing disk $J^3$ connected by balls $J^4$ with a disk $J^5$ held on the upper end of the bearing $J^2$ by a nut $J^6$ screwing on the terminal of the bearing $J^2$. Thus by the arrangement described, the support K supports the nut J, which in turn carries the screw rod I from which the tubing G is suspended, and the bearing $J^2$ is free to turn in the support K. On the bearing $J^2$ is secured a ring O' provided with a pivoted handle O adapted to be taken hold of by the operator, for periodically holding the said bearing $J^2$, the extension J' and the nut J from turning, as hereinafter more fully explained. On the upper end of the tubing G are attached suitable handles or other devices P, for conveniently turning the tubing, with a view to rotate the cutter C for the cutter wheels B to cut into the casing A.

The device is used as follows: When the several parts are in position, as shown in the drawings and the handle P is turned by the operator, then the tubing G and with it the cutter C as well as the screw rod I and nut J are turned, to cause the cutter wheels B to make an annular cut on the inner face of the casing A. As the cutting proceeds, the operator takes hold of the handle O and temporarily holds the bearing $J^2$, the extension J' and the nut J from turning, while the turning operation of the tubing G continues, so that the screw rod I screws up in the nut J and thus lifts the tubing G and with it the mandrel H, to force the bearings E outward with a view to cause the cutter wheels B to cut deeper into the wall of the casing A. Now from the foregoing, it will be seen, that by the operator continually turning the tubing G and consequently the cutter C and periodically holding the nut J against turning, the screw rod I and with it the tubing G and mandrel H are lifted, to cause the mandrel H to gradually feed the cutter wheels B deeper into the wall of the casing A until the latter is cut. By reference to Fig. 2, it will be seen that the screw rod I is provided with a left-hand thread, so as to permit turning the tubing G from the right to the left, and when the nut J is held against turning the screw rod I screws upward in the nut, for the purpose previously explained.

By feeding the cutter wheels gradually as described, it is evident that the cutter wheels are not liable to be injured, and hence the device remains serviceable for many cuts to the depth of the casing, to cut the latter into the desired number of sections.

Having thus described my invention, I claim as new and desire to secure by Letters Patent:

1. A feed mechanism for feeding the cutter wheels of a revoluble cutter for cutting a well casing, consisting of a feed screw attached to the tubing extending in the well casing and carrying and rotating the cutter, and for moving the expanding mandrel for the cutter wheels, a nut screwing on the said feed screw and having a revoluble connection with suspending means, and means for holding the said nut against turning while the tubing is rotated.

2. A feed mechanism for feeding the cutter wheels of a revoluble cutter for cutting a well casing, comprising a tubing extending in the well casing, and carrying at its lower end a mandrel for expanding the cutter wheels of the revoluble cutter, means for turning the said tubing, a screw rod attached to the upper end of the said tubing, a nut screwing on the said screw rod, a support in which the nut is journaled, and means for periodically holding the nut against turning.

3. A feed mechanism for feeding the cutter wheels of a revoluble cutter for cutting a well casing, comprising a tubing extending in the well casing and carrying at its lower end a mandrel for expanding the cutter wheels of the revoluble cutter, means for turning the said tubing, a screw rod attached to the upper end of the said tubing, a nut screwing on the said screw rod, a ball bearing head held on the said nut, a support in which the said head is journaled, and a treadle on the said nut for periodically holding the same against turning.

In testimony whereof I have signed my name to this specification in the presence of two subscribing witnesses.

WILLIAM CUSHING.

Witnesses:
J. J. DAVIN,
BOYD E. WARNE.